Sept. 4, 1956 F. E. HANSEN 2,761,469
VALVED COUPLING
Filed Dec. 6, 1950
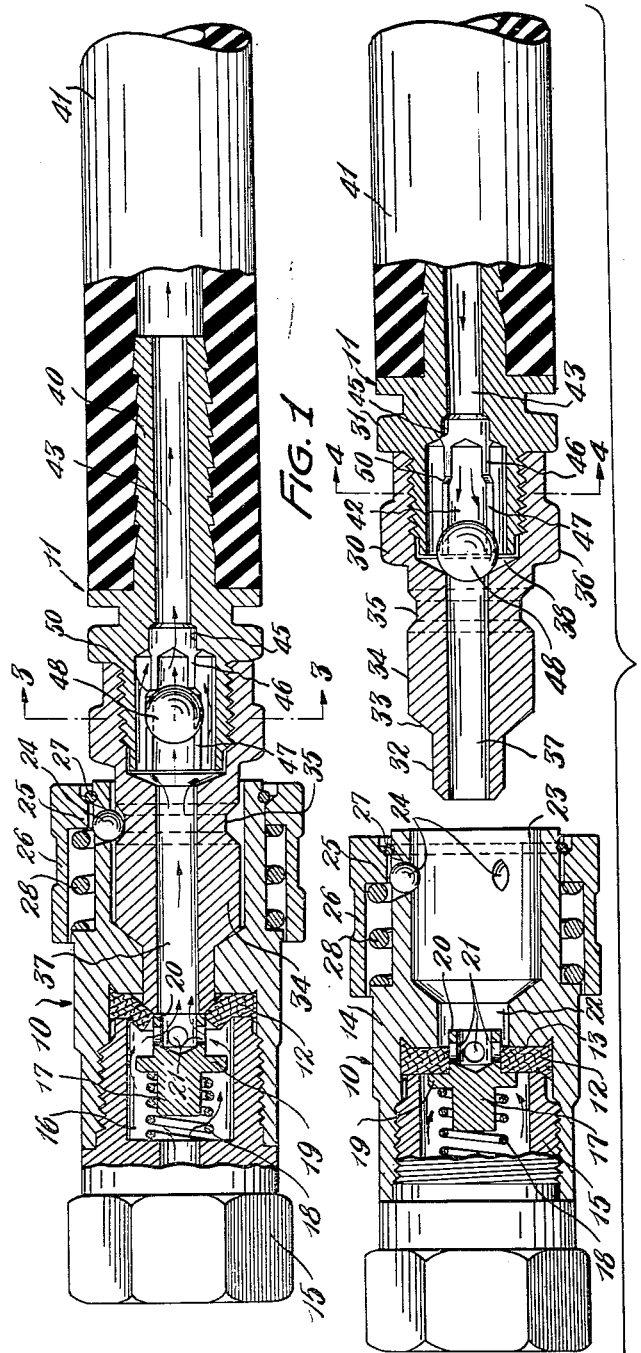
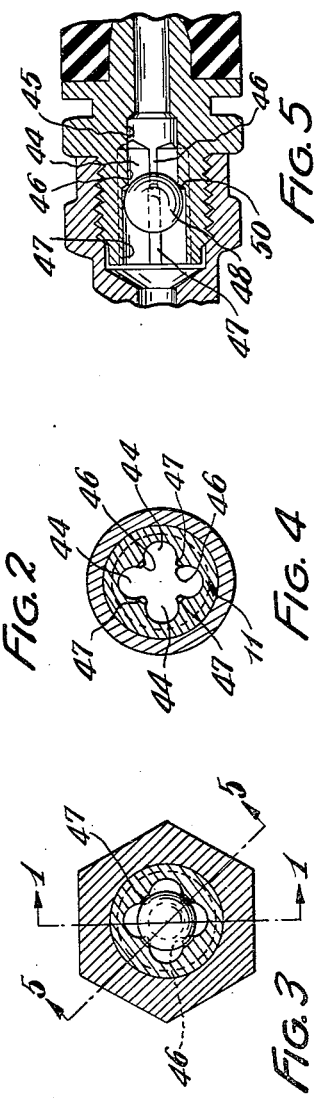
INVENTOR.
FRED E. HANSEN
BY Hudson, Boughton,
Williams, David & Hoffmann.
ATTORNEYS

2,761,469

VALVED COUPLING

Fred E. Hansen, Lakewood, Ohio, assignor to The Hansen Manufacturing Company, Cleveland, Ohio, a corporation of Ohio Application December 6, 1950, Serial No. 199,497

4 Claims. (Cl. 137—614)

This invention relates to improvements in valved couplings and has reference particularly to couplings for pressure fluid lines. In a compressed air line for example, embodying a coupling between a fluid supply and service hose to the outer end of which some air operated tool is connected, the coupling member attached to the service hose must close very promptly when the coupling is disconnected as otherwise the reaction to the rapid flow of air out of the hose will cause the latter to whip about vigorously, somewhat in the manner of a chicken with its head off. Such a hose may be fifteen or twenty feet long and of course will contain a considerable volume of compressed air. This volume of air should be dispelled but it should be discharged gradually so that the hose will lie quietly and will not cause the metal coupling member while whipping about to strike a workman or bystander and cause injury.

It is generally considered advisable to relieve the pressure in the service hose when it has been disconnected from the pressure supply line, and for this reason I employ an all metal valve of a character such that leakage will occur in an amount sufficient to reduce the pressure to atmospheric within a comparatively short time. A ball valve is convenient and cheap for the purpose. I have discovered however that ordinary ball valves do not always close promptly, and hence the whipping action referred to above may take place.

It is an object of the present invention therefore to provide a valved coupling having a leaking check valve in the service hose member of the coupling which is immediate and certain in its closing action.

It is also an object of the invention to construct a ball guiding means which will be inexpensive to manufacture and which will not interfere with the free flow of pressure fluid when the coupling members are connected together.

Other objects and features of novelty will appear as I proceed with the description of that embodiment of the invention which, for the purposes of the present application, I have illustrated in the accompanying drawing, in which Fig. 1 is a longitudinal sectional view of a valved coupling embodying the invention, the view being taken substantially in the plane indicated by the line 1—1 of Fig. 3, showing the two members of the coupling connected in operative position with the valves open.

Fig. 2 is a similar view with the two members of the coupling disengaged and the valves in closed position.

Figs. 3 and 4 are cross-sectional views taken substantially along the lines 3—3 and 4—4 of Figs. 1 and 2, and Fig. 5 is a fragmental longitudinal sectional view taken along the line 5—5 of Fig. 3 and showing the valve of the service hose coupling member in open position.

As shown in Figs. 1 and 2 the coupling of this invention comprises two separable members 10 and 11. The female member 10 may assume different forms, the one illustrated being similar so far as its automatic valve is concerned to that of my prior Patent 2,092,116 issued September 7, 1937. It comprises a resilient gasket 12 backed throughout most of its extent by an annular wall 13 which is part of the body casting 14. A fitting 15 is threaded into the casting 14, its inner extremity bearing against the gasket 12 and securing it in place. Fitting 15 is designed for connection with a pressure fluid supply. This fitting is hollow and provides a pocket 16 in which there is disposed a valve piece 17 that is guided and urged to the right, as viewed in the drawing, by a coil spring 18. Valve piece 17 has a flange 19 with a flat face which normally bears against gasket 12, thus closing and sealing the valve. Valve piece 17 also has a cylindrical projection 20 that extends through the central opening in gasket 12 in the closed position of the valve. This projection is hollow and has a series of radial holes 21. In the open condition of the valve illustrated in Fig. 1 these holes are uncovered, leaving a clear passage for fluid from the pocket 16 of fitting 15, around the flange 19 and through the holes 21 into the hollow interior of the projection 20. Casting 14 has an inner central bore 22 merging with a larger bore 23 which is open at the free end of the coupling member. Three or more balls 24 mounted in cavities in the casting 14 are normally covered by an internal annular rib 25 on a slidable sleeve 26 which is normally held against a snap ring 27 by a coil spring 28. When the sleeve 26 is pulled back against the force of spring 28 the balls 24 will be uncovered by the rib 25 so that they can be cammed outwardly as will now be described.

The male member 11 of the coupling is preferably composed of two parts 30 and 31 threaded together as shown. Part 30 has a forward extremity 32 which is adapted to fit within the bore 22 of casting 10, a bevel shoulder 33 and a larger cylindrical portion 34 of a size to fit within the bore 23 of casting 10. Part 30 also has an annular groove 35 with beveled sides and a hex 36 for receiving a wrench. Part 30 has an axial bore 37 which merges with a tapered socket 38 to form a circular valve seat of the width of a line.

When the two members of the coupling are to be connected together the operator grasps sleeve 26 and retracts it whereupon he projects member 11 into member 10, the tapered surface 33 of member 11 camming the balls 24 outwardly. They then ride over the cylindrical surface 34 and into the groove 35. The operator may then release sleeve 26 which will be returned to the illustrated position by the force of spring 28. Rib 25 will thus lock the balls into the groove 35 and the two members and the coupling will be secured together.

Part 31 of the male member 11 has a stem 40 serrated for connection with a service hose 41. It also has a nose 42 which is threaded to be received within the threaded socket 38 of part 30. This part 31 has a bore 43 in alignment with bore 37. Nose 42 has a ball guiding means surrounding this bore. In order to provide this ball guiding means I drill four holes 44 in the nose 42. Then I drill a larger hole centrally of a diameter indicated at 45 in Fig. 5, which larger hole cuts through the holes 44 and forms segmental walls 46. The drill is a stepped drill which cuts a larger circle at the outer end of the hole and forms segments 47 which I term guide tracks. These tracks are spaced apart a distance just sufficient to provide clearance for a ball 48, which is formed of hard material, for example stainless steel.

Where the segments 47 end and the segments 46 begin shoulders 50 are formed, and these shoulders constitute stops which prevent the ball from moving toward the right beyond the position illustrated in Figs. 1 and 5. The holes 44 however extend beyond this position of the ball, as clearly indicated in the drawing, so that in this position there are four passages for fluid around the ball which provides free flow of fluid from the supply to the tool when the coupling is connected as in Fig. 1. When the coupling is disconnected, relieving the pressure from the supply, the ball 48 shifts immediately to the left in an axial line, being guided by the tracks 47 precisely onto the seat formed at the intersection of bore 37 and tapered socket 38. Thus instantaneous closure of the valve prevents any whipping of the hose and the objectionable effects of such whipping.

Having thus described my invention, I claim:

1. A separable coupling for a high pressure fluid line, comprising a female member adapted to be attached to a high pressure supply having a valve biased toward closed position and a gasket for sealing the valve, said coupling also comprising a male member adapted to be attached to a flexible hose conductor, said male member being adapted to open said valve when said coupling is assembled, means in said male member for minimizing the rate of discharge of pressure fluid from said hose conductor, comprising an elongated valve chamber having a circular metallic seat at its forward end axially disposed with respect to said chamber, a metal ball in said chamber adapted to engage said seat, said seat being adapted to permit the passage of fluid in limited amount when said ball is in engagement with said seat, and guide means for directing the movements of said ball axially at all times toward and away from said seat, said guide means having clear passages around said ball when it is off said seat.

2. In a separable coupling member for the pressure supply end of a fluid pressure hose, said coupling having a bore, means for minimizing the discharge of pressure fluid comprising an elongated valve chamber having a hard circular seat of line width only at one end axailly disposed with respect to the chamber, a metal ball adapted to engage said seat, said chamber having therein ball guide means for preventing radial movement of said ball at all times while permitting longitudinal movement toward and away from said seat, said guide means having shoulders for limiting the rearward travel of the ball and having lengthwise passages around said ball when the latter is in engagement with said shoulders.

3. In a separable coupling member for the pressure supply end of a fluid pressure hose, said coupling having a bore, means for minimizing the rate of discharge of pressure fluid from said hose comprising an elongated valve chamber having a circular metallic seat of line width only at one end axially disposed with respect to the chamber, a metal ball adapted to engage said seat for providing a leaking closure, said chamber having therein ball guide means for preventing radial movement of said ball at all times while permitting longitudinal movement toward and away from said seat, said guide means comprising at least three longitudinal tracks for engagement with the surface of the ball and having inwardly extending shoulders for limiting the rearward travel of the ball, and said guide means having longitudinal passages disposed between adjacent tracks in open communication at their ends with the bore of the member.

4. In a separable coupling member for the pressure supply end of a fluid pressure hose, two parts threadably connected having aligned bores, the inner end of one of said parts having a tapered socket intersecting the bore of the part to form a circular valve seat of line width only, a metal ball adapted to engage said seat for providing a leaking closure, the inner end of the other part being formed to provide guide means for preventing radial movement of said ball at all times while permitting longitudinal movement thereof toward and away from said seat, said guide means comprising at least three longitudinal tracks for engagement with the surface of the ball, and said guide means having longitudinal passages disposed between adjacent tracks, said passages meeting said tapered socket at one end and communicating with the bore of the second part at the other end, and inwardly extending shoulders on said tracks at a point intermediate the ends of said passages.

References Cited in the file of this patent

UNITED STATES PATENTS

| | | |
|---|---|---|
| 165,391 | Warker | July 6, 1875 |
| 999,608 | Stucky | Aug. 1, 1911 |
| 1,151,329 | Audett | Aug. 24, 1915 |
| 1,237,252 | Paul | Aug. 14, 1917 |
| 1,427,105 | Handlan | Aug. 29, 1922 |
| 1,896,528 | Strong | Feb. 7, 1933 |
| 2,092,116 | Hansen | Sept. 27, 1937 |
| 2,108,714 | Hirsch et al. | Feb. 15, 1938 |
| 2,296,135 | Batson et al. | Sept. 15, 1942 |
| 2,322,462 | Marguardt | June 22, 1943 |
| 2,461,206 | Fouse | Feb. 8, 1949 |
| 2,493,937 | Wright | Jan. 10, 1950 |
| 2,518,299 | Fernandez | Aug. 8, 1950 |
| 2,576,687 | Krehbiel | Nov. 27, 1951 |